United States Patent
Bridges et al.

(10) Patent No.: US 11,313,659 B2
(45) Date of Patent: Apr. 26, 2022

(54) MEASURING TAPE WITH END HOOK HAVING A HIGH FRICTION SURFACE TREATMENT

(71) Applicant: APEX BRANDS, INC., Apex, NC (US)

(72) Inventors: Tobias McKay Bridges, Holly Springs, NC (US); Kay Randolph Ligon, Raleigh, NC (US); Kevin Fitzpatrick, Apex, NC (US); Eric Dean Broadaway, New Freedom, PA (US); Tom Carson, Apex, NC (US); Jonathan Seibert Beckwith, Charlotte, NC (US); David Roberts, Fuquay Varina, NC (US); Jimmy Shangyao Wei, New Taipei (TW); Vlad Petru Patrangenaru, Ellicott City, MD (US); Chad D. Humphrey, Columbia, SC (US); Brian Butler, Charlotte, NC (US); Brendan Michael Walsh, Holly Springs, NC (US)

(73) Assignee: Apex Brands, Inc., Apex, NC (US)

( * ) Notice: Subject to any disclaimer, the term of this patent is extended or adjusted under 35 U.S.C. 154(b) by 17 days.

(21) Appl. No.: 16/643,119

(22) PCT Filed: Aug. 28, 2018

(86) PCT No.: PCT/US2018/048266
§ 371 (c)(1),
(2) Date: Feb. 28, 2020

(87) PCT Pub. No.: WO2019/046248
PCT Pub. Date: Mar. 7, 2019

(65) Prior Publication Data
US 2020/0333123 A1 Oct. 22, 2020

Related U.S. Application Data

(60) Provisional application No. 62/551,447, filed on Aug. 29, 2017.

(51) Int. Cl.
*G01B 3/1003* (2020.01)
*G01B 3/1056* (2020.01)
*G01B 3/1071* (2020.01)

(52) U.S. Cl.
CPC ......... *G01B 3/1056* (2013.01); *G01B 3/1003* (2020.01); *G01B 3/1071* (2013.01); *G01B 2003/1076* (2013.01)

(58) Field of Classification Search
CPC .. G01B 3/1056; G01B 3/1003; G01B 3/1071; G01B 2003/1076
(Continued)

(56) References Cited

U.S. PATENT DOCUMENTS

| 5,077,911 A * | 1/1992 | von Wedemeyer | G01B 3/1056 33/770 |
| 5,210,956 A * | 5/1993 | Knispel | G01B 3/1005 33/761 |

(Continued)

FOREIGN PATENT DOCUMENTS

DE 9305426 U1 7/1993

OTHER PUBLICATIONS

INDASA Schleifmittel GmbH: "INDASA Die beste Losung fur die Oberflachenbehandlung—Katalog Aug. 2016".
(Continued)

*Primary Examiner* — Yaritza Guadalupe-McCall
(74) *Attorney, Agent, or Firm* — Burr & Forman, LLP

(57) ABSTRACT

A measuring tape device may include a housing having an aperture, a reel assembly, a blade having a first end configured to extend from the housing through the aperture and a
(Continued)

second end configured to be wound on the reel assembly, and an end hook disposed at the first end of the blade. The end hook may have a front face that faces away from the aperture and a rear face that faces toward the aperture. A high friction surface including grains may be disposed over at least a portion of a surface of the rear face.

20 Claims, 5 Drawing Sheets

(58) Field of Classification Search
USPC .......................................................... 33/758
See application file for complete search history.

(56) References Cited

U.S. PATENT DOCUMENTS

| | | | | |
|---|---|---|---|---|
| 5,349,760 | A | 9/1994 | Devito | |
| 5,402,583 | A * | 4/1995 | Komura | G01B 3/1056 |
| | | | | 33/758 |
| 6,568,099 | B2 * | 5/2003 | Bergeron | G01B 3/1071 |
| | | | | 33/758 |
| 6,874,245 | B2 * | 4/2005 | Liu | G01B 3/1056 |
| | | | | 33/758 |
| 7,475,492 | B1 * | 1/2009 | Huang | G01B 3/1056 |
| | | | | 33/758 |
| 7,946,053 | B2 * | 5/2011 | Huang | G01B 3/1056 |
| | | | | 33/758 |
| 10,545,013 | B2 * | 1/2020 | Tsai | G01B 3/1056 |
| 2002/0011008 | A1 * | 1/2002 | Nelson | G01B 3/1056 |
| | | | | 33/758 |
| 2003/0070315 | A1 * | 4/2003 | Bergeron | G01B 3/1071 |
| | | | | 33/770 |
| 2004/0064962 | A1 * | 4/2004 | Liu | G01B 3/1056 |
| | | | | 33/758 |
| 2010/0236086 | A1 * | 9/2010 | Huang | G01B 3/1056 |
| | | | | 33/770 |
| 2020/0333123 | A1 * | 10/2020 | Bridges | G01B 3/1071 |

OTHER PUBLICATIONS

International Search Report and Written Opinion dated Nov. 13, 2018, from International Application No. PCT/US2018/048266, all pages herein cited in it's entirety.

* cited by examiner

MEASURING TAPE WITH END HOOK HAVING A HIGH FRICTION SURFACE TREATMENT

CROSS REFERENCE TO RELATED APPLICATION

This application claims priority to U.S. application No. 62/551,447 filed Aug. 29, 2017, the entire contents of which are hereby incorporated by reference in its entirety.

TECHNICAL FIELD

Example embodiments generally relate to measuring tape devices, and particularly relate to a measuring tape that has an end hook configured to avoid slippage relative to many different types of surfaces.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. By employing an end hook at one end of the tape, the user may take advantage of the standout to pay out the measuring tape toward an anchor point on a media that is to be measured and then conduct the measurement without having to physically move to the anchor point to affix the end hook and then move away to make the measurement. However, if the end hook is unable to be affixed remotely to the anchor point, the operator may ultimately have to physically place the end hook at the anchor point (perhaps after multiple attempts at doing it remotely). Even then, the end hook could slip off sometimes, leading to additional frustration for the operator. Thus, having an end hook that is less likely to slip off, and more likely to engage a medium being measured, can be very attractive to consumers.

BRIEF SUMMARY OF SOME EXAMPLES

Some example embodiments may enable the provision of a measuring tape that has a high friction surface treatment on its end hook. The end hook may thus be enabled to be reliably anchored on a number of different surfaces without slippage. This improved gripping of an anchor point, regardless of the material of which the anchor point is made, may improve the user experience associated with use of the measuring tape.

In an example embodiment, a measuring tape device is provided. The measuring tape device may include a housing having an aperture, a reel assembly, a blade having a first end configured to extend from the housing through the aperture and a second end configured to be wound on the reel assembly, and an end hook disposed at the first end of the blade. The end hook may have a front face that faces away from the aperture and a rear face that faces toward the aperture. A high friction surface including grains may be disposed over at least a portion of a surface of the rear face.

In another example embodiment, an end hook for a measuring tape device is provided. The end hook may include a front face that faces away from an aperture through which a blade of the measuring tape device is extendible, a rear face that faces toward the aperture, and a high friction surface comprising grains disposed over at least a portion of a surface of the rear face.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 3A:
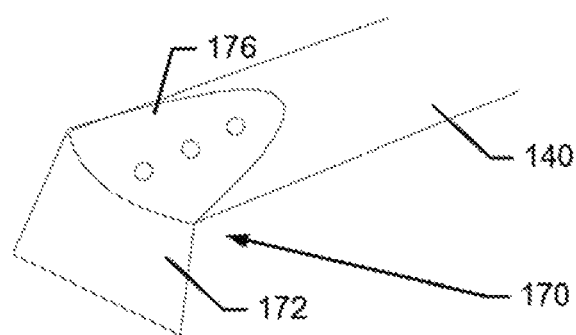
Figure 3B:
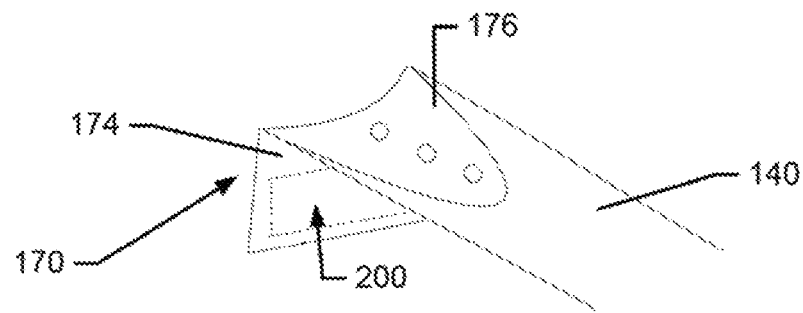
Figure 3C:
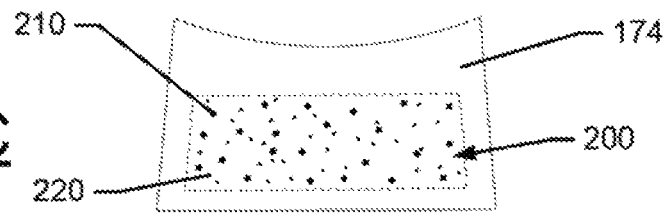
Figure 3D:
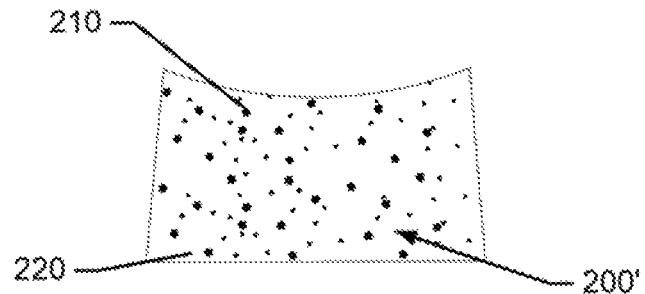
Figure 3E:
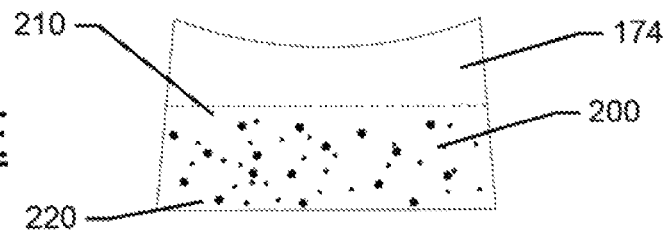
Figure 3F:
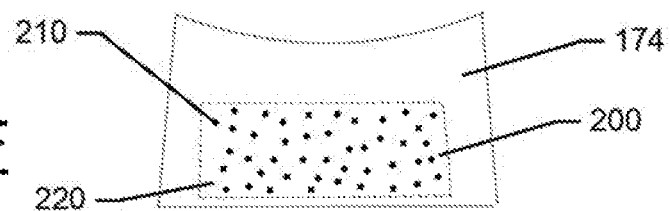
Figure 3G:
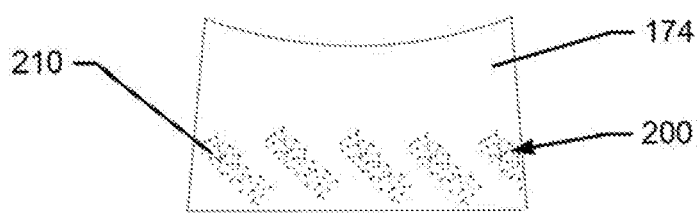
Figure 4:
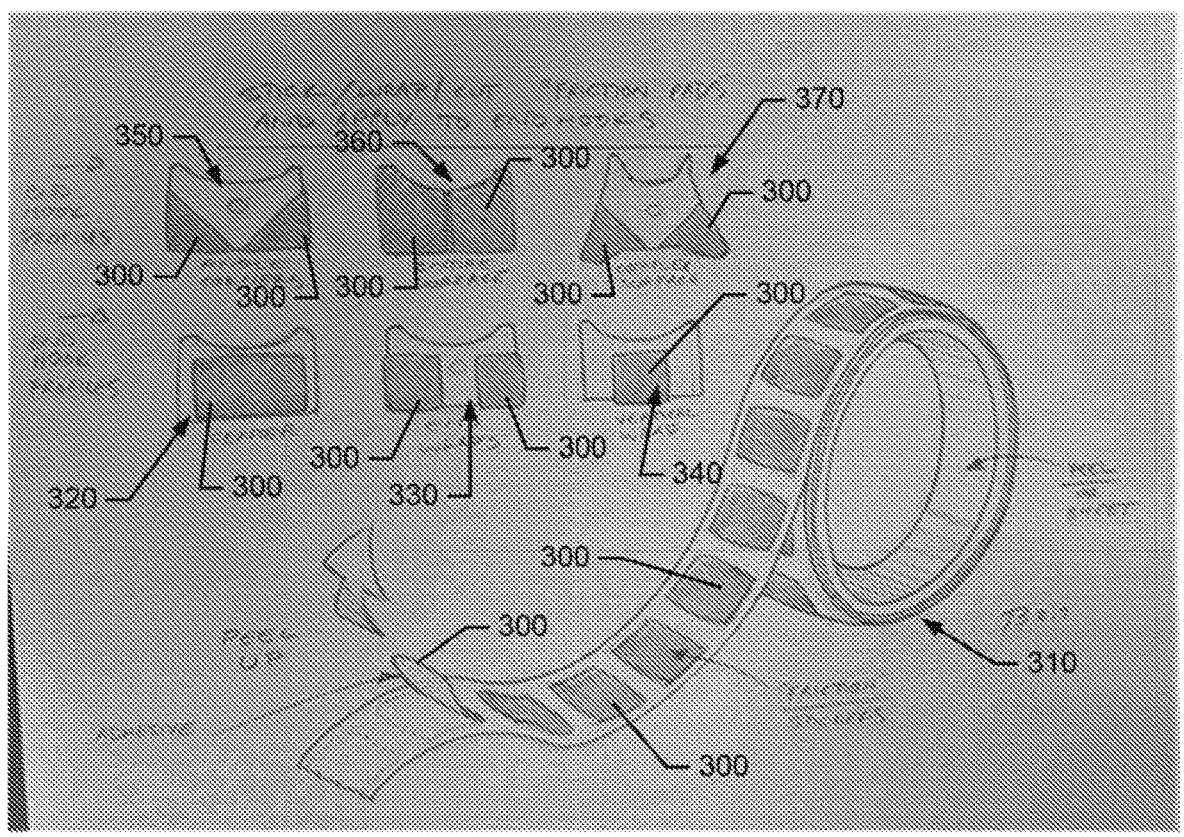

FIG. 3, which is defined by FIGS. 3A, 3B, 3C, 3D, 3E, 3F and 3G illustrates various views and example configurations for a high friction surface of an end hook in accordance with an example embodiment; and FIG. 4 illustrates a peel off end hook high friction surface that can be applied in a number of configurations via adhesive in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved end hook. This is accomplished by providing the end hook to include an aggressive grit material or other high friction material on a surface of the end hook that faces the anchor point of the measuring tape. Measuring tapes have previously been made to include end hooks that have protrusions aimed backward toward the anchor point.

These rear facing (i.e., facing in a direction substantially parallel to the direction of extension of the blade of the tape measure, and substantially perpendicular to the direction of extension of the end hook) protrusions are provided to dig into soft materials (such as wood) to decrease the likelihood of slippage of the end hook off the soft material to which the end hook is attempted to be anchored. Thus, the protrusions can create a much greater amount of gripping capability or friction with soft materials. However, for hard materials, and particularly for hard materials with a smooth surface (such as steel or other metals), these protrusions may drastically decrease the contact surface area between the end hook and the material to which the end hook is being anchored, and slippage may actually become much more likely. This effectively makes a measuring tape with protrusions on the end hook virtually unusable, or at least much less desirable for use, for a rather large number of contexts. The corresponding measuring tape is then essentially specialized only for one use (i.e., use with wood or other soft materials).

Figure 1:
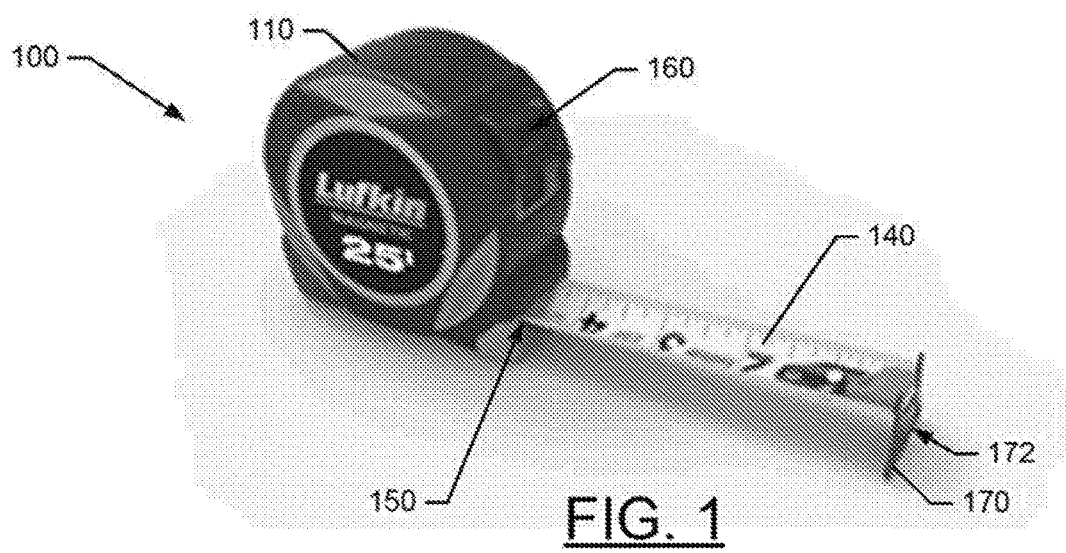
FIG. 1 illustrates a perspective view of a measuring tape device in accordance with an example embodiment.

Example embodiments are directed to providing an end hook that can effectively balance the desire to increase friction with the need to avoid too much loss of contact surface area so that such an end hook can be reliably anchored on a variety of surfaces without slippage. Some example embodiments therefore use an aggressive grit provided on a rear facing surface of the end hook to increase friction, but provide the aggressive grit over a larger area of the rear facing surface of the end hook to also increase the contact area between the end hook and the material to which the end hook is to be anchored. The grit material that is provided on the end hook may, for example, create a multitude of miniature protrusions that can effectively increase the friction between the end hook and both hard and soft materials to which the end hook may be anchored in various different contexts. Thus, the resulting tape measure employing such an end hook can be advantageously employed in every context and need not be specialized only to use with specific limited types of materials. FIG. 1 illustrates a perspective view of a measuring tape device, and FIG. 2 illustrates a block diagram of such device, in accordance with an example embodiment.

Figure 2:
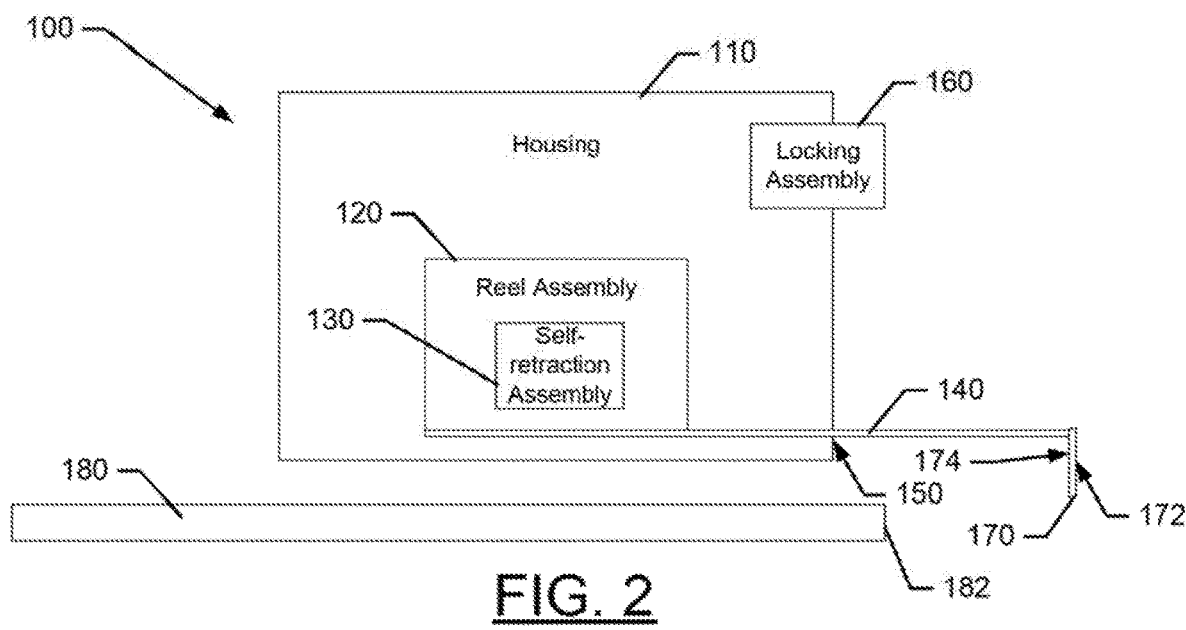
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may include a front face 172 that faces away from the direction of extension of the blade 140 and a rear face 174 that faces toward the blade 140 and the aperture 150. The rear face 174 and the front face 172 may lie in planes that are substantially parallel to each other, and substantially perpendicular to a direction of extension of the blade 140 when the blade 140 is paid out of the aperture 150.

The end hook 170 may be affixed (temporarily) to a medium 180 that is to be measured at an anchor point 182. When affixed to the anchor point 182, the rear face 174 generally faces the medium 180 and/or engages a surface of the medium 180 while the front face 172 is on an opposing side of the end hook 170 relative to the medium 180 and faces away from the medium 180. Once the end hook 170 is affixed to the anchor point 182, the blade 140 may be paid out of the aperture 150 and unwound from the reel assembly 120. During this pay out of the blade 140, the rear face 174 of the end hook 170 may grip and therefore retain engagement with the medium 180 at the anchor point 182. The amount of friction between the rear face 174 and the surface of the medium 180 that is engaged thereto may determine how well the end hook 170 grips and retains engagement with the medium 180. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point 182, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point (e.g., anchor point 182) while the blade 140 continues to have sufficient rigidity to standout. When the blade 140 has been extended to allow the end hook 170 to engage the anchor point 182, or when the operator manually places the end hook 170 at the anchor point 182, the blade 140 can be extended to perform any intended measurements so long as the end hook 170 remains fixed at the anchor point 182.

For a typical, flat piece of media that is being measured, the blade 140 (which generally has a shallow U-shaped cross section) lays across the medium 180 and the end hook 170 engages the anchor point 182 such that the medium 180 and the anchor point 182 are both below the blade 140 (or at least on the same side of the blade 140). However, it is possible that measurements may be desirable in other orientations for the blade 140 and the end hook 170. With other orientations, however, gravity may work to unseat the end hook 170 from the anchor point 182. To attempt to accommodate other orientations, the end hook 170 could, for example, be provided with an enhanced ability to grip the surface of the medium 180 being measured at the anchor point 182. The enhanced gripping capability may not only provide flexibility in terms of the orientations that can be supported by the end hook 170, but may also provide flexibility in terms of the different types of materials for which the end hook 170 may be enabled to effectively grip the anchor point 182.

FIG. 3, which is defined by FIGS. 3A, 3B, 3C, 3D, 3E, 3F and 3G, illustrates an example of a high friction surface 200 provided on the rear face 174 of the end hook 170 in accordance with an example embodiment. Referring to FIGS. 3A to 3F, the end hook 170 may further include a base portion 176 that extends substantially parallel to a surface of the blade 140 and is affixed thereto (e.g., via rivets or the like). The front face 172 and rear face 174 may each extend substantially perpendicular to the base portion 176. However, the rear face 174 only may be provided with the high friction surface 200.

The high friction surface 200 may be provided over a portion of the rear face 174, as shown in FIGS. 3B, 3C, 3E, 3F and 3G, or the high friction surface 200 may be provided over substantially all of the rear face 174, as shown in FIG. 3D. In some cases, the high friction surface 200 may be situated only on specific portions of the rear face 174. For example, the high friction surface 200 may be disposed on the rear face 174 such that edges of the high friction surface 200 are spaced apart from corresponding edges of the rear face 174 as shown in FIGS. 3C and 3F. In such an example, the edges of the high friction surface 200 may be equidistantly spaced apart from the bottom and side edges of the rear face 174, as shown in FIG. 3C, or the edges may have different spacing therebetween, as shown in FIG. 3F. In some embodiments, edges of the high friction surface 200 may correspond to at least a portion (and sometimes all) of the edges of the rear face 174. For example, FIG. 3E illustrates an embodiment in which bottom edges of both the high friction surface 200 and the rear face 174 are coextensive over their entire lengths. However, side edges of the high friction surface 200 are coextensive with side edges of the rear face 174 over only a portion (in this case more than half) of the length of the edges of the rear face 174. This arrangement may advantageously provide a majority (e.g., over half) of the exposed surface area of the rear face 174 to be covered with the high friction surface 200 to maximize the amount of surface area that can grip the medium 180 at the anchor point 182. Moreover, since the specific portion of the rear face 174 that is covered with the high friction surface 200 is the bottom portion, it is more likely that the high friction surface area 200 will come into contact with the medium 180 even if the rear face 174 is at a slight angle to the medium 180 instead of being parallel thereto when the operator attempts to anchor the end hook 170 at the anchor point.

The high friction surface 200 may be take a number of different shapes and forms. Thus, although FIGS. 3C-3F illustrate the high friction surface area 200 as a substantially rectangular (or at least quadrilateral shape), other shapes are also possible. Moreover, in some cases, the high friction surface 200 could be embodied as a pattern of shapes (e.g., a cross hatch shape) as shown in FIG. 3G. The various examples may increase a coefficient of friction of the end hook 170 relative to the medium 180 by at least a factor of 2 or 3, and sometimes more relative to an untreated surface.

The high friction surface 200 may be formed by embedding by grains 210 into a base material 220. The grains 210 may be granular objects of any desirable type. For example, the grains 210 may be made of abrasive granules or granules of resin or plastic. In some cases, the abrasive granules may be made of silica, glass, ceramics, diamond dust, aluminum oxide, cubic zirconium, black zirconium, garnet, staurolite, emery, corundum, and/or the like. Granules made of resin or plastic may be selected to have any desirable hardness level. As such, some granules may actually be somewhat compressible or flexible, while other granules may be rigid and substantially incompressible. In some examples, the grains 210 (regardless of material used to form the grains 210) may be coated with a resin or plastic having desired characteristics. The grains 210 may be substantially all of similar sizes or diameters (as shown in FIG. 3F), or the grains 210 may have random or varying sizes/diameters (as shown in FIGS. 3C to 3E). In still other examples, metallic grit (e.g., steel or copper) may be employed for the granules and thus, for example, the granules could even have magnetic properties in some cases.

In an example embodiment, the base material 220 may be an adhesive that can bind to the material used to form the end hook 170. The material used to form the end hook 170 may be metal, plastic, resin, and/or the like. However, in some cases, the base material 220 could be the same material used to form the end hook 170. Regardless of the material used to form the base material 220, in some examples the base material 220 may be applied and then the grains 210 may be embedded therein. In some cases, the grains 210 may be embedded by applying an adhesive or binder as the base material 220 and then placing the base material 220 in an electrostatic field to facilitate random deposition of the grains 210 thereon. The grains 210 may become embedded and may then be baked or heat cured into the base material 220. If desired and as mentioned above, a resin or other coating may then be applied over the grains 210 and the base material 220.

Although the high friction surface 200 could be applied at the factory, in some cases the high friction surface 200 could also be applied by users. In such an example, the high friction surface 200 could be embodied as a series of friction pads 300 (each of which may be formed individually as described above). The friction pads 300 may be releasably retained on a sheet or roll 310 and may be peeled off and then applied to the end hook of any of a number of different end hook designs, in any of a number of different configurations. For example, the user may simply wrap the friction pads 300 onto the end hook, and the friction pads 300 may be held on the end hook by adhesive. The friction pads 300 can therefore be added or replaced to any desirable configuration by the operator at any time. Thus, warn out friction pads 300 could be replaced with new ones, or the operator could reconfigure the high friction surface 200 to any desirable arrangement for use in different contexts or environments.

FIG. 4 illustrates a plurality of end hook profiles and corresponding arrangements for provision of the friction pads 300 thereon. In this regard, for example, end hook profile 320 includes a center arrangement for the friction pad 300, whereas end hook profile 330 provides for an end wrap arrangement for two friction pads 300 at opposing corners of the end hook. End hook provide 340 shows a vertical wrap arrangement for the friction pad. End hook profile 350 illustrates an angled corner wrapping using two friction pads 300, and end hook profile 360 shows coverage of the entire surface of the end hook. Meanwhile, end hook profile 370 shows angled corner coverage using two friction pads 300 over a more complex end hook surface shape.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without That which is claimed:

1. A measuring tape device comprising:
a housing having an aperture;
a reel assembly;
a blade having a first end configured to extend from the housing through the aperture and a second end configured to be wound on the reel assembly; and
an end hook disposed at the first end of the blade, the end hook having a front face that faces away from the aperture and a rear face that faces toward the aperture,
wherein a width of the end hook is greater than a width of the blade such that portions of the end hook extend outside the width of the blade to provide an expanded surface area for engagement of at least the rear face with a measurement anchor surface, and
wherein a high friction surface comprising grains is disposed on the portions of the end hook that extend outside the width of the blade.

2. The device of claim 1, wherein the high friction surface is disposed of substantially all of the surface of the rear face.

3. The device of claim 1, wherein the high friction surface is disposed on the rear face such that edges of the high friction surface are spaced apart from corresponding edges of the rear face.

4. The device of claim 3, wherein bottom and side edges of the high friction surface and corresponding bottom and side edges of the rear face are substantially equidistantly spaced apart.

5. The device of claim 3, wherein bottom edges of the high friction surface are spaced apart from corresponding bottom edges of the rear face by a different amount than side edges of the high friction surface are spaced apart from corresponding side edges of the rear face.

6. The device of claim 1, wherein a surface area of the high friction surface is greater than 1/2 a surface area of the rear face.

7. The device of claim 1, wherein at least a bottom edge of the high friction surface is coextensive with a bottom edge of the rear face.

8. The device of claim 1, wherein the grains have substantially uniform or different sizes.

9. The device of claim 1, wherein the grains are embedded in a base material disposed on the rear face.

10. The device of claim 9, wherein the base material is an adhesive.

11. The device of claim 1, wherein the grains are embedded in a base material disposed on the rear face, and
wherein the grains are covered with a resin coating.

12. The device of claim 1, wherein the high friction surface is disposed on both the front face and the rear face.

13. The device of claim 1, wherein the end hook comprises a first angled corner that extends outside the width of the blade on a first side of the blade and a second angled corner that extends outside the width of the blade on a second side of the blade, and
wherein the high friction surface is disposed on the first and second angled corners.

14. The device of claim 1, wherein a bottom edge of the end hook is nonlinear such that a first fraction of the bottom edge lies on a first plane and a second fraction of the bottom edge lies outside the first plane.

15. A measuring tape device comprising:
a housing having an aperture;
a reel assembly;
a blade having a first end configured to extend from the housing through the aperture and a second end configured to be wound on the reel assembly; and
an end hook disposed at the first end of the blade, the end hook having a front face that faces away from the aperture and a rear face that faces toward the aperture,
wherein a width of the end hook is greater than a width of the blade such that portions of the end hook extend outside the width of the blade to provide an expanded surface area for engagement of at least the rear face with a measurement anchor surface,
wherein a high friction surface comprising grains is disposed on the portions of the end hook that extend outside the width of the blade, and
wherein the grains comprise resin or plastic grains that are compressible.

16. An end hook for a measuring tape device, the end hook comprising:
a front face that faces away from an aperture through which a blade of the measuring tape device is extendible;
a rear face that faces toward the aperture; and
a high friction surface comprising grains,
wherein a width of the end hook is greater than a width of the blade such that portions of the end hook extend outside the width of the blade to provide an expanded surface area for engagement of at least the rear face with a measurement anchor surface, and
wherein the high friction surface is disposed on the portions of the end hook that extend outside the width of the blade.

17. The end hook of claim 16, wherein the high friction surface is disposed on substantially all of the surface of the rear face, or
wherein the high friction surface is disposed on the rear face such that edges of the high friction surface are spaced apart from corresponding edges of the rear face.

18. The end hook of claim 17, wherein bottom and side edges of the high friction surface and corresponding bottom and side edges of the rear face are substantially equidistantly spaced apart, or
wherein bottom edges of the high friction surface are spaced apart from corresponding bottom edges of the rear face by a different amount that side edges of the high friction surface are spaced apart from corresponding side edges of the rear face.

19. The end hook of claim 16, wherein the grains have substantially uniform or different sizes.

20. The end hook of claim 16, wherein the grains are embedded in a base material disposed on the rear face,
wherein the base material is an adhesive, and
wherein the grains are covered with a resin coating.

* * * * *